Figure 1:
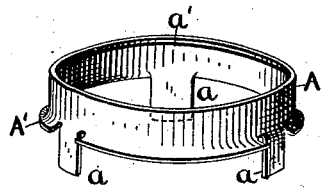

(No Model.)

J. BOOTH.
SPINNING RING.

No. 272,941. Patented Feb. 27, 1883.

WITNESSES.
W. H. Thurston.
J. Knight.

INVENTOR.
John Booth

UNITED STATES PATENT OFFICE.

JOHN BOOTH, OF LINCOLN, ASSIGNOR TO FALES & JENKS MACHINE COMPANY, OF PAWTUCKET, AND STEPHEN A. JENKS, OF LINCOLN, R. I.

SPINNING-RING.

SPECIFICATION forming part of Letters Patent No. 272,941, dated February 27, 1883.

Application filed July 14, 1880. (No model.)

*To all whom it may concern:*

Be it known that I, JOHN BOOTH, of Lincoln, in the county of Providence and State of Rhode Island, have invented certain new and useful Improvements in the Manufacture of Spinning-Rings; and I do hereby declare that the following specification, taken in connection with the accompanying drawings, forming a part of the same, is a full, clear, and exact description thereof.

My said improvements relate to a novel construction of two-part spinning-rings. "Two-part spinning-rings," as that term is used by me, are such as have a base and a race separately constructed, as distinguished from rings having a raceway integral with the base. Said two-part rings may be properly classed into two general varieties: first, such as have a race fixedly attached to its base, and, secondly, such as have a race readily detachable from its base. It is to the first class that one portion of my present improvements relate; and it consists in the combination of a solid race circularly grooved and inwardly-recessed on its under side, and a solid base having a contracted circular upper edge, which occupies the annular recess of the race, and is thereby fixedly interlocked with said race. The circularly-grooved and inwardly-recessed race is not new, as is instanced by my prior Letters Patent No. 180,529, dated August 1, 1876; but therein said race is employed in combination with a split base, thus rendering the race readily detachable, and outside of the class to which my present invention pertains.

A solid base has heretofore been used with a race which was annularly grooved, but not inwardly recessed, and said base did not have a contracted upper edge, and therefore the race was readily detachable therefrom. A solid base and a race grooved and inwardly recessed on its under side have also heretofore been combined to form a ring; but said race, instead of being circularly grooved, was grooved elliptically, and instead of the base being contracted for fixedly interlocking with said race it was also elliptical in form at its upper edge, and the two parts were united and as readily disunited by the rotation of the race on the base. Solid bases and plain-surfaced race-sections, as well as grooved races, have also heretofore been rigidly combined; but, having no interlocking joint, they have been united by means of solder, which, whether it be of the soft or hard variety, is liable to unduly soften the race by the heat employed, and, even if that be avoided, the expense involved in the soldering operation is a serious objection, coupled with the expense of the careful finish necessary for removing overflowed or misplaced solder from surfaces with which the traveler comes in contact. This branch of my invention is to produce a spinning-ring having all of the desirable qualities of the integral ring, with such economy in stock and labor as is incident to the production of a two-part ring.

So far as my knowledge extends, I am the first to rigidly interlock a race with its base-piece, and this is best effected by the inward recessing of the annular groove of the race and the contraction of the upper edge of the base, so that it occupies a portion of said groove, after the manner of a dovetail joint. The particular means by which the contraction of the upper edge of the base is effected are comparatively immaterial, so far as relates to the locking of the two parts fixedly together; but said means may be profitably varied according to circumstances—as, for instance, if the base be composed of sheet metal or wrought metal, its upper edge may be contracted, so as to firmly interlook with the race, by the application of external pressure, while in a revolving chuck, after the manner of "spinning" sheet metal; or said contraction may be effected on rings composed of heavier wrought metal by peripheral compressing-dies applied closely adjacent to the upper edge of the base while the race is in position. With a cast-iron base, however, the spring or the compressing operation would be liable to objections because of the brittle nature of the metal, and therefore such bases are heated, and thereby expanded, before the race is applied thereto, and the subsequent contraction of said base, including its upper edge, incident to cooling, results in the desired permanent interlocking joint, and this method may also be employed with wrought-metal bases. Whether the race be applied while the bases are hot or cold, they are evenly contracted in whole or in part, and thereby made to firmly grip the race and to fill the inwardly-recessed portion of the race-groove for obtaining the permanent interlocking joint desired. The method described of uniting a solid base and a solid race by contracting the base, so that it will firmly grip upon the race, for making a two-part spinning-ring practically integral is novel with me, so far as my knowledge extends.

Another portion of my invention is applicable to rings in general, because it relates to means for securing them to their rails; and it consists in providing the ring at its base with depending arms so far flexible or springy that when they are forced downward into the usual opening or annular seat in a ring-rail the ring will be securely held therein, and for assuring the location of the race in a plane parallel with the upper surface of the ring-rail the usual annular bearing-flange is provided.

Figure 3:
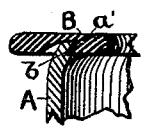
Figure 2:
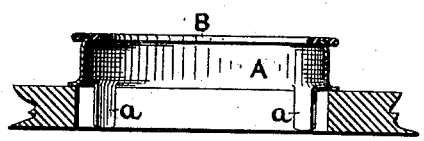
Figure 4:
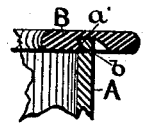
Figure 5:
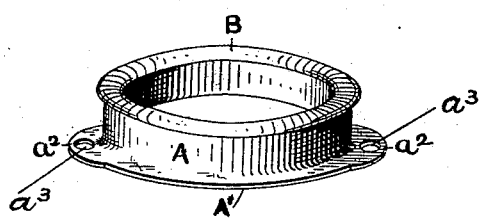

Referring to the drawings, Figure 1 represents in perspective a ring-base with the depending arms. Fig. 2 represents a ring embodying both features of my invention as applied to a ring-rail. Fig. 3 represents in section a race and base interlocked by mechanical contraction of the upper edge of the base. Fig. 4 represents in section a race and base interlocked by the contraction of a base previously expanded by heat. Fig. 5 represents in perspective a ring embodying the novel interlocking permanent joint and a base with a flange, as heretofore.

It will be understood that, so far as relates to the first-recited portion of my improvement, the base A, at its lower edge, may be varied in form indefinitely. As to its upper edge, said base must have an annular lip, $a'$, which, when contracted, fits into and occupies the inwardly-recessed portion $b$ of the circular groove in the under side of the race B, so that when the base and race are thus put together they will be firmly and permanently united by an interlocking joint involving the well-known principles of the "dovetail." If the contraction of the upper edge of the base is to be effected by spinning or compression, said upper edge is originally made of such diameter as will enable the race to be snugly placed thereon; but when said contraction is effected by shrinkage after heating, the upper edge of the ring, when cold, is made of such diameter as will enable it, when expanded by heat, to snugly receive the race, and thereafter, when cooled, to properly occupy the inwardly-recessed portion of the circular groove of the race.

The depending arms $a$ shown in Figs. 1 and 2 are portions of a sheet-metal base, preferably struck up by means of suitable dies, and accompanied by an outwardly-projecting flange, $A'$, for affording a proper seat upon the upper surface of the ring-rail. Said arms are flexible and more or less springy, and therefore, being normally inclined outward a little, they can readily be inserted into the usual circular seats of a ring-rail and made to firmly engage therewith. These arms may be varied in number; but I find that three, as shown, may be usually relied upon for good results. Such arms are not limited to bases or rings composed in whole or in part of sheet metal, because such rings as have heretofore been provided with annular necks for occupying the circular seats in the ring-rail may be provided therewith in lieu of said necks, and thus not only obviate the cost of employing set-screws or other similar means for securing rings to rails, but also obviate the weakening of rails incident to the use therein of set-screws.

If it be desirable to so mount my novel two-part rings that they may be readily adjusted on the rail with relation to the spindles employed therewith, the pendent arms are dispensed with, and the flange $A'$ is provided, as shown in Fig. 5, with ears, as at $a^2$, perforated for the reception of holding-screws, substantially as heretofore.

Having thus described my invention, I claim as new and desire to secure by Letters Patent—

1. In a spinning-ring, the combination, substantially as hereinbefore described, of a solid race circularly grooved and inwardly recessed on its under side, and a solid base having a contracted circular upper edge, which occupies the annular recess of the race, and is thereby fixedly interlocked therewith.

2. A spinning-ring constructed with depending spring-arms fitted to press against the interior surface of the circular opening through the ring-rail and hold the ring in its place on the rail concentric with such opening, substantially as described.

JOHN BOOTH.

Witnesses:
W. H. THURSTON,
I. KNIGHT.